3,791,980
PROCESS FOR ESTABLISHING REACTIVE CONTACT BETWEEN REACTIVE INGREDIENTS
Clifton R. Goldsmith, Borger, Tex., assignor to
Phillips Petroleum Company
Original application Aug. 3, 1970, Ser. No. 60,533, now
Patent No. 3,679,599. Divided and this application
Mar. 17, 1972, Ser. No. 235,490
Int. Cl. C09k 3/00, 3/30
U.S. Cl. 252—188.3 R          4 Claims

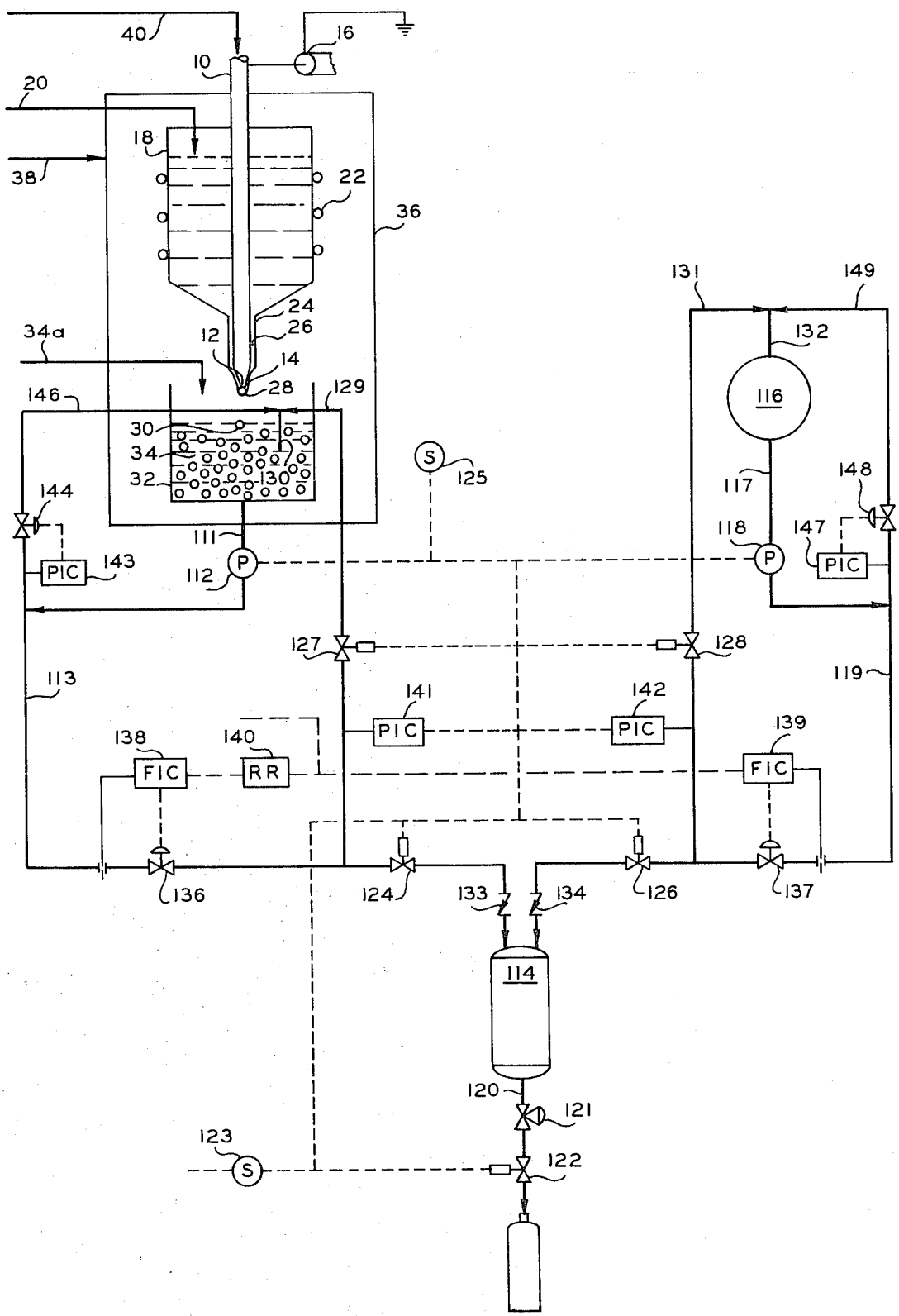

ABSTRACT OF THE DISCLOSURE

A curing agent (for example, an amine) for an epoxy resin is encapsulated in a readily rupturable thermoplastic material (for example, wax), and admixed with an epoxy resin under a first pressure which is in excess of atmospheric and sufficient to preclude rupture of said readily rupturable thermoplastic material. The resulting admixture is thereafter exposed to a second pressure less than the first pressure, whereby said readily rupturable thermoplastic material is ruptured, thereby causing the mixture of curing agent and epoxy resin to come into reactive contact.

---

This is a division of applicaition Ser. No. 60,533, filed Aug. 3, 1970, now U.S. Pat. 3,679,599.

This invention relates to aerosol containers. It further relates to aerosol containers having therein, at pressures in excess of atmospheric pressure, encapsulated liquids and nonencapsulated liquids. This invention still further relates to a capsule-containing aerosol container wherein the contained capsules burst upon exposure to atmospheric pressure when released from the container.

A valved chamber under pressure having therein an active ingredient wherein the active ingredient is ejected from the chamber through the opened valve by an expanding propellant is well known in the aerosol art. These articles have found many successful commercial applications, such as medicinal and toiletry dispensers, solvent and cleaner dispensers and in the so-called spray-paint cans.

It has also been proposed to place at least two active ingredients in an aerosol container wherein one of the ingredients is a curing agent for the other. An example of this proposal is the placement of an uncured epoxy resin and a curing agent therefor in an aerosol can in order to produce a self-curing epoxy coating. The problem associated with this proposal is in holding the reactants in common storage under nonreacting conditions. One solution features storing the ingredients in separate containers until use, at which time they are mixed in a single aerosol device. This solution requires substantially immediate use of the entire mix in order to avoid curing the materials in the device, and inherently prevents lengthy common storage of the reactants.

Another solution advanced has been to place at least two active ingredients in common storage in a liquid container wherein one of the ingredients is encapsulated in the form of drops in small protective shells. The shell prevents reaction between the reactants until ready for use, at which time the reactants are discharged through a single valve. Upon application of pressure external to the shell, such as the shell striking the object to be coated, the shell is ruptured, thus causing the reactants to combine and react. One problem with this technique is that the ingredients are not permitted to mix thoroughly in intimate reactive contact until they are physically present on the object to be coated.

It is thus an object of this invention to provide a process for establishing reactive contact between at least two reactive ingredients held in common storage, at least one of said ingredients being maintained within a protective shell, whereby reactive contact between the ingredients is established substantially immediately upon release from storage.

It is another object of this invention to provide an improved article of manufacture for storage and application of self-curing ingredients.

It is a further object of this invention to provide a method for making liquid-containing capsules wherein the capsules are subjected to positive internal pressure sufficient to rupture them upon exposure to atmosphere.

It is still another object of this invention to provide a method for placing pressurized capsules in an aerosol container.

Other objects, aspects, and the several advantages of the invention will be apparent to one skilled in the art upon studying the following specification, drawing, and claims.

In accordance with this invention, I have discovered that a mixture comprising at least two mutually reactive ingredients can be held in intimate though nonreactive contact, but readily placed in reactive contact when desired, by maintaining said mixture in a zone wherein one of said reactants is encapsulated in a protective shell which bursts upon release of said mixture from said zone.

Further in accordance with this invention, a mixture comprising at least two reactive ingredients and a propellant are placed in common storage in a vessel, the vessel having a chamber and a valve communicating with the chamber. The chamber is held under sufficient internal pressure such that whenever the valve communicating therewith is open the mixture is discharged through the valve when operating against atmospheric pressure. The reactive ingredients of the mixture, while in common storage, are in a nonreactive condition because at least one of the ingredients is contained in a plurality of small capsules. However, substantially immediately after release of the mixture through the valve the capsules, being subjected to sufficient internal pressure, bursts upon exposure to atmospheric pressure. The bursting of the capsules releases the contained reactant, thus effecting complete mixing of the reactants and placing them in intimate reactive relationship before the reactants are in actual physical contact with any object. Thus, placing in an aerosol can an uncured epoxy resin, a propellant, and a curing agent for the resin, such as an amine, the curing agent being contained in capsules under pressure, and then releasing the contents for the purpose of coating an object, the uncured resin and the curing agent are completely mixed and in reactive contact before or at least by the time they physically contact the object.

The bursting of a capsule, upon exposure to the pressure of the atmosphere in order to produce the mixing and reactive contact between reactants as proposed by this invention, is actually a function of the pressure differential between the internal pressure of the capsule and the pressure immediately surrounding the capsule. Stated differently, if the pressure drop across the confining capsule material exceeds the strength limitations of the material, the capsule will rupture regardless of its location. It is accordingly important that the capsule internal pressure does not exceed the internal pressure of the chamber by the minimum differential pressure required to burst the capsule. It is to be understood that this minimum differential pressure is a function of the nature and thickness of the capsule material. Although the capsule internal pressure must not exceed the internal pressure of the chamber by an amount equal to the minimum pressure differential required to burst the capsule, the capsule internal pressure can be less than the internal pressure of the chamber so long as the capsule internal pressure exceeds atmospheric pressure by an amount at least equal to the minimum pressure differential required to burst the capsule.

In order to provide the mixing and intimate reactive contact contemplated by this invention, it is considered that the capsules should resist burst until the minimum differential pressure is at least 10 pounds per square inch.

As an aid in developing a destructive explosive bursting of the capsule, as distinguished from a pressure release through a crack in the capsule wall, a suitable compressible material which tends to expand against the enclosing capsule walls is placed in the capsules along with the encapsulated reactive ingredient. The compressible material must be inert to the encapsulated reactant and can be any inert gas, or it can be a propellant of suitably high vapor pressure at ordinary atmospheric temperatures, such as the propellant used to eject the entire mixture from the chamber. It is preferred, however, that the reactive ingredient encapsulated be mixed and encapsulated with a suitable inert gas in order to insure an expanding gas phase within the capsules at the moment of wall rupture which occurs upon discharge of the mixture from the chamber.

In view of the requirement that the capsules containing the reactive ingredient burst whenever the capsules are exposed to atmospheric pressure, there is a problem involved in the making of the capsules and in transferring the produced capsules from the point of manufacture to the ultimate pressurized dispensing chamber. In this regard the art supplies several techniques for producing non-pressurized encapsulated material, and the art also supplies a technique for mixing and introducing ingredients into pressurized dispensing chambers. With the improvements described herein to the process and apparatus described in the art, capsules are produced and transferred under pressure to the ultimate pressurized chamber.

A process and apparatus for making the pressurized liquid-containing capsules useful herein, and a method and apparatus for placing the capsules as well as other ingredients into a pressurized storage vessel, such as an aerosol can, are set out in the description below in connection with the figure, which is a schematic representation of one embodiment of this invention.

The invention will be described with reference to the encapsulation of an amine useful in accelerating the curing or hardening of epoxy type resins, although it will be understood that the materials described are illustrative and not limiting of the invention.

A conduit or tube 10 having a restricted orifice 12 is provided for discharging droplets 14 of an electrically conductive amine such as diethyl amine. The liquid amine is fed to the tube 10 at a controlled rate of approximately 100 pounds per hour, as by a constant rate pump, not shown. The orifice 12 is preferably of small size, for example, 1 mm. The size of the droplets of any particular liquid is suitably controlled by the rate of liquid feed and additionally by an electrical charge imparted to the liquid as indicated schematically at 16 by an electrode of an electrostatic generator. Thus, the size of the droplets may be controlled by the magnitude of the voltage. For each increase of about 200 volts in the range from 3,000 to 12,000 volts, the diameter of the droplets is reduced by approximately one-half. Most effective operation lies in the range of 6,000 to 12,000 volts. When the droplets break from the orifice 12, the surface is charged with an excess of electrons. Due to the uniform charge distribution over the conductive surface, the droplets assume a regular spherical shape. The particles may be reduced to extremely small size by this method, less than 0.1 mm.

A container 18 surrounds the vertical portion of the conduit 10 and is of restricted diameter at its lower end to form a concentric tube 24 around the conduit with a slight annular space 26 therebetween. A suitable thermoplastic coating material, such as wax, is deposited in the container 18. The thermoplastic coating is heated by any convenient heating means, e.g., electric coils 22, so that it is maintained in a desired molten state. The viscosity of the thermoplastic coating should permit fluid flow freely through annular space 26. The coating forms a closure 28 over the end of the orifice which breaks and forms around each drop 14 as it is discharged from the orifice. The coating level in container 18 preferably is maintained constant to provide a constant flow rate at the discharge orifice. The coating level is maintained by the introduction of coating into container 18 by line 20.

The restricted dimension of the annular opening or passageway 26, as well as the viscosity, regulates the thickness of thermoplastic flowing therethrough and as the amine droplets fall through the coating, the coating uniformly encapsulates each particle with a layer of thermoplastic material about 0.1 mm. thick to form the encapsulated particle 30. Vessel 32, containing a cold liquid bath 34, serves to receive the coated droplets 30 as they fall. The cold bath serves to harden the thermoplastic about the liquid particles. The liquid in the cold bath is preferably the aerosol propellant to be used to eject the encapsulated amine and the epoxy type resin from the valved pressure chamber. The aerosol propellant is introduced into vessel 32 via line 34*a* at a constant rate. Where the propellant used is normal butane, the feed rate via line 34*a* is approximately 50 pounds per hour.

Pressure vessel 36 completely encloses container 18, vessel 32, the portion of conduit 10 surrounded by container 18, concentric tube 24, and heating means 22. Nitrogen, to pressurize the interior of vessel 36, is introduced into pressure vessel 36 by convenient means, such as by conduit 38. Pressure vessel 36 is then maintained with the inert gas at any desirable pressure at least equal to the above-mentioned minimum differential pressure required to burst the capsules. The encapsulated particles 30, thus formed under pressure, have an internal pressure equal to the pressure maintained in the interior of pressure vessel 36. Where the liquid utilized in bath 34 is propellant such as normal butane, then the pressure maintained in pressure vessel 36 is preferably at least equal to the vapor pressure of the propellant.

In another aspect of this invention, an inert gas, such as nitrogen, is introduced into conduit 10 via line 40. The inert gas thus introduced is blended and mixed with the amine contained in conduit 10. The blending of the inert gas with the amine insures that the produced capsules do have a gas phase contained therein which tends to expand against the capsule walls to aid in the development of a force to burst the capsules. In this embodiment, where amine is introduced at 100 pounds per hour, nitrogen gas is introduced via 40 at 0.75 pound per hour.

The thermoplastic shell may be made from low melting polyethylenes, such polyethylenes in admixture with wax, plasticized vinyl resins, gelatin and similar compounds or mixtures which soften to fluid viscosity at reasonable elevated temperatures.

The diethyl amine, having been encapsulated under pressure as described above, is then mixed with an epoxy type resin, such as the diglycidyl ether of Bisphenol A having a molecular weight of approximately 390 (which is the reaction product of Bisphenol A and epichlorohydrin and commercially available from Shell Chemical as Epon 828), and placed in an aerosol container.

Referring again to the drawing, capsules and propellant are withdrawn from storage vessel 32 via conduit means 111 and pumped via pumping means 112 through conduit 113 to a mixing chamber 114. The epoxy resin dissolved in a suitable solvent therefor, such as acetone, the solution of resin in solvent having approximately 1 pound epoxy resin per 1 pound solvent and hereafter referred to as the resin solution, is withdrawn from vessel 116 via conduit means 117 and pumped via pumping means 118 through conduit 119 to mixing chamber 114. Within mixing chamber 114 the capsules, propellant, and resin solution are blended. Mixing chamber 114 can contain baffles or other means for thoroughly mixing the fluid streams passed to said mixing chamber 114. In this embodiment there is introduced into mixing chamber 114 approximately 100 pounds per hour of the diglycidyl ether of Bisphenol A resin-acetone solution, 50 pounds per hour of n-butane, 100 pounds per hour of diethyl amine, and 0.75 pound per hour of nitrogen gas.

The blended mixture of capsules, propellant, and resin solution is withdrawn from mixing chamber 114 via conduit means 120 and passed through a pressure regulator 121 to a means, not herein illustrated, for introducing the resultant aerosol mixture into the aerosol package.

The flow of the blended mixture through conduit 120 is controlled by a solenoid valve means 122 which is actuated by a switch 123. With switch 123 positioned in the "off" position, a signal is transmitted to valve means 122 closing valve means 122. This "off" signal is also transmitted as illustrated to solenoid valves 124 and 126, closing valves 124 and 126. With switch 123 in the closed or "off" position, a signal is transmitted as illustrated to solenoid valve means 127 and 128, opening valves 127 and 128. Therefore, with switch 123 in the "off" position, capsules and propellant withdrawn from storage vessel 32 via conduit means 111 and pumped via pumping means 112 through conduit means 113 is recirculated to storage vessel 32 via conduit means 129 and conduit means 130. In a like manner, resin solution withdrawn from storage vessel 116 via conduit means 117 and pumped via pumping means 118 through conduit means 119 is recirculated via conduit means 131 and conduit means 132 to storage vessel 116. Thus, an interruption of the flow of the blended mixture from mixing chamber 114 automatically results in recirculation of the liquids to be blended to the storage vessels.

Conversely, with switch 123 positioned in the "on" position, valves 122, 124 and 126 are opened and valves 127 and 128 are closed, resulting in the flow of capsules, propellant and resin solution to mixing chamber 114. Check valves 133 and 134 are positioned adjacent mixing chamber 114 so as to prevent the flow of fluid from mixing chamber 114 into conduits 113 and 119, respectively.

As herein illustrated, valves 122, 124, 126, 127 and 128 are quick-acting solenoid valves actuated by an electrical signal passed from switch means 123. It is also within the scope of this invention to employ other quick-acting valve means actuated by electric or pneumatic signals.

The composition of the blend produced in mixing chamber 114 is controlled by controller valves 136 and 137. Controller valves 136 and 137 are operated by conventional flow indicator-controllers 138 and 139, respectively. Controller valves 136 and 137 and flow controllers 138 and 139 can be pneumatic or electric acting. As illustrated, the ratio of capsules, propellant, and resin solution passed to mixing chamber 114 is maintained substantially constant by passing air from an air supply source as a set point signal to flow indicator-controller 139 and to a conventional pneumatic ratio relay 140. Responsive to the air input signal, ratio relay 140 transmits a signal as a set point signal to flow indicator-controller 138 so as to maintain the desired ratio of capsules and propellant to resin solution within mixing chamber 114.

In operation, controller valves 136 and 137 are maintained in a substantially fixed position so as to maintain a substantially constant set flow through each of the said valves.

Flow controller valves 136 and 137 would not be satisfactory operating in the place of solenoid valves 124 and 126, respectively. For example, after interruption of flow of the blended mixture from mixing chamber 114 and the flow of the blending constituents to mixing chamber 114, it is required that, upon resumption of flow of blending constituents to mixing chamber 114, "set flow" be established immediately to provide the desired blend in mixing chamber 114 and conduit 120. This would not be possible were the flow of capsules, propellant, and resin solution to mixing chamber 114 interrupted by valve means 136 and 137, respectively, as valves 136 and 137 are not quick-acting valves. An interval of time would be required before the flow of capsules and propellant through valve 136 and resin through valve 137 would conform to the predetermined "set flow."

In the event of the loss of flow represented by a loss of pressure of either of the fluid blending constituents in conduit 113 and conduit 119 as determined by pressure indicator-controllers 141 and 142, respectively, either or both of pressure indicator-controllers 141 and 142 transmit a signal to solenoid valves 122, 124, 126, 127 and 128, closing valves 122, 124 and 126 and opening valves 127 and 128.

Pressure indicator-controller 143 positioned in the discharge of pumping means 112 is employed to maintain a constant pressure upstream of valve means 136. Pressure indicator-controller 143 will manipulate valve 144 so as to recycle the excess capsules and propellant to storage vessel 32 via conduit means 146 and 130, thereby maintaining a constant pressure in conduit 113 upstream of the orifice for flow indicator-controller 138. In a like manner, pressure indicator-controller 147 will manipulate valve 148 so as to recycle excess resin solution to storage vessel 116 via conduit means 149 and 132, thereby maintaining a constant pressure in conduit 119 upstream of the orifice of flow indicator-controller 139. By operating pumping means 112 and 118, respectively, to produce liquid feed rates in excess of the rates required to be delivered to mixing chamber 114, the operation of valves 144 and 148 to recycle the excess liquid, as described above, will insure that the contents of vessels 32 and 116 remain uniformly mixed.

As illustrated, it is within the scope of this invention to provide a switch 125 for the transmission of a stop signal to pumps 112 and 118, a close valve signal to valves 122, 124 and 126, and an open valve signal to valves 127 and 128.

Reasonable variations and modifications of this invention can be made or followed, in view of the foregoing disclosure, without departing from the spirit or scope thereof.

I claim:

1. A process for establishing reactive contact between a curing agent for an opexy resin and an epoxy resin which comprises encapsulating said curing agent in a readily rupturable thermoplastic material, admixing the resulting encapsulated curing agent with said epoxy resin under a first pressure which is in excess of atmospheric and which is sufficient to preclude rupture of said readily rupturable thermoplastic material, and thereafter exposing the resulting admixture of encapsulated curing agent and epoxy resin to a second pressure which is less than said first pressure whereby said readily rupturable thermoplastic material is ruptured, thereby causing a mixture of said curing agent and epoxy resin to come into reactive contact.

2. A process according to claim 1 wherein said curing agent is diethylamine and said epoxy resin is a diglycidyl ether of Bisphenol A resin-acetone solution.

3. A process according to claim 1 wherein said capsule is formed of rupturable thermoplastic material selected from the group consisting of low melting polyethylenes, plasticized vinyl resins, and gelatin.

4. A process according to claim 1 wherein said thermoplastic material is wax.

References Cited
UNITED STATES PATENTS

| | | | |
|---|---|---|---|
| 3,160,686 | 12/1964 | Doyle et al. | 264—4 |
| 3,396,116 | 8/1968 | Adams et al. | 252—316 X |
| 3,367,991 | 2/1968 | Hicks | 260—834 |
| 3,679,102 | 7/1972 | Charle et al. | 252—316 X |
| 2,631,138 | 3/1953 | Dannenberg | 260—834 |

RICHARD D. LOVERING, Primary Examiner

U.S. Cl. X.R.

252—305, 316